United States Patent
You et al.

(10) Patent No.: US 9,642,144 B2
(45) Date of Patent: May 2, 2017

(54) METHOD FOR TRANSMITTING AND RECEIVING DATA UNIT BASED ON UPLINK MULTIPLE USER MULTIPLE INPUT MULTIPLE OUTPUT TRANSMISSION AND APPARATUS FOR THE SAME

(71) Applicant: LG ELECTRONICS INC., Seoul (KR)

(72) Inventors: Hyang Sun You, Anyang-si (KR); Ill Soo Sohn, Anyang-si (KR); Yong Ho Seok, Anyang-si (KR); Jong Hyun Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/946,271

(22) Filed: Nov. 19, 2015

(65) Prior Publication Data

US 2016/0143018 A1    May 19, 2016

Related U.S. Application Data

(63) Continuation of application No. 14/126,393, filed as application No. PCT/KR2012/001372 on Feb. 23, 2012, now Pat. No. 9,203,586.
(Continued)

(51) Int. Cl.
*H04L 27/00* (2006.01)
*H04W 72/04* (2009.01)
(Continued)

(52) U.S. Cl.
CPC ............ *H04W 72/046* (2013.01); *H04B 7/04* (2013.01); *H04B 7/0413* (2013.01);
(Continued)

(58) Field of Classification Search
CPC .. H04L 5/0053; H04L 27/2602; H04W 84/12; H04B 7/0413; H04B 7/04
See application file for complete search history.

(56) References Cited

U.S. PATENT DOCUMENTS 8,472,383 B1 *   6/2013   Banerjea ........... H04W 72/0473
                                                 370/328
8,571,010 B1 *  10/2013   Zhang ..................... H04L 29/10
                                                 370/230

(Continued)

FOREIGN PATENT DOCUMENTS

KR    WO 2011/065743 A1   6/2011   ............... H04B 7/04

*Primary Examiner* — Jay P Patel
(74) *Attorney, Agent, or Firm* — Dentons US LLP

(57) ABSTRACT

In an aspect, a method of receiving a data unit, performed by an Access Point (AP), in a Wireless LAN (WLAN) system is provided. The method includes transmitting a signal protection frame, the signal protection frame comprising a group ID field indicating a Multiple Input Multiple Output (MIMO) transmission STA group including a first station (STA) and a second STA; and, a spatial stream field indicating a number of spatial streams allocated to each of member STAs included in the MIMO transmission STA group; receiving a first preamble for a first data unit from the first STA; receiving a second preamble for a second data unit from the second STA; and simultaneously receiving the first data unit from the first STA and the second data unit from the second STA.

8 Claims, 10 Drawing Sheets

Related U.S. Application Data

(60) Provisional application No. 61/497,062, filed on Jun. 15, 2011.

(51) Int. Cl.

| | | |
|---|---|---|
| *H04B 7/04* | (2017.01) | |
| *H04B 7/0413* | (2017.01) | |
| *H04L 5/00* | (2006.01) | |
| *H04W 84/12* | (2009.01) | |
| *H04L 27/26* | (2006.01) | |
| *H04B 7/0452* | (2017.01) | |
| *H04B 7/06* | (2006.01) | |

(52) U.S. Cl.
CPC ......... *H04B 7/0452* (2013.01); *H04B 7/0697* (2013.01); *H04L 5/0053* (2013.01); *H04L 27/2602* (2013.01); *H04W 84/12* (2013.01)

(56) References Cited

U.S. PATENT DOCUMENTS

| | | | |
|---|---|---|---|
| 8,842,606 B2 | 9/2014 | Denteneer et al. | 370/328 |
| 8,891,653 B2 | 11/2014 | Seok et al. | 375/267 |
| 8,989,161 B2 | 3/2015 | Kim et al. | 370/338 |
| 2008/0101269 A1* | 5/2008 | Jung | H04W 72/042 370/312 |
| 2009/0041135 A1* | 2/2009 | Ismail | H04L 27/2678 375/260 |
| 2010/0008318 A1 | 1/2010 | Wentink et al. | |
| 2010/0260114 A1* | 10/2010 | Vermani | H04L 1/1854 370/329 |
| 2011/0002219 A1 | 1/2011 | Kim et al. | |
| 2011/0096796 A1 | 4/2011 | Zhang et al. | |
| 2011/0110348 A1 | 5/2011 | Lee et al. | |
| 2011/0164597 A1 | 7/2011 | Amini et al. | 370/338 |
| 2011/0201368 A1* | 8/2011 | Faccin | H04B 7/0413 455/507 |
| 2012/0026928 A1 | 2/2012 | Gong et al. | 370/312 |
| 2012/0060075 A1 | 3/2012 | Gong et al. | 714/776 |
| 2012/0106371 A1 | 5/2012 | Abraham et al. | 370/252 |
| 2012/0207231 A1* | 8/2012 | Zhang | H04L 27/2613 375/260 |
| 2012/0230242 A1 | 9/2012 | Kim et al. | 370/312 |
| 2012/0263091 A1 | 10/2012 | Kim et al. | 370/312 |
| 2012/0300874 A1* | 11/2012 | Zhang | H04L 5/0048 375/295 |
| 2012/0327914 A1* | 12/2012 | Kang | H04L 5/0023 370/336 |
| 2013/0058273 A1 | 3/2013 | Wentink et al. | 370/328 |
| 2013/0070658 A1 | 3/2013 | Noh et al. | 370/311 |
| 2013/0188567 A1 | 7/2013 | Wang et al. | 370/329 |
| 2013/0250904 A1* | 9/2013 | Kang | H04B 7/0452 370/329 |
| 2014/0004865 A1* | 1/2014 | Bhargava | H04W 74/0816 455/445 |

* cited by examiner

Fig. 4

| DYN_BANDWIDTH_IN_NON_HT | First 7 bits of Scrambling Sequence | | |
|---|---|---|---|
| Not present | 5 bit pseudo-random nonzero integer of CH_BANDWIDTH_IN_NON_HT equals NON_HT_CBW 20 and 5 bit peusdo-random integer otherwise | | 0 (NON_HT_CBW 20) 1 (NON_HT_CBW 40) 2 (NON_HT_CBW 80) 3 (NON_HT_CBW 160 NON_HT_CBW 80+80) |
| Present | 4 bit pseudo-random nonzero integer of CH_BANDWIDTH_IN_NON_HT equals NON_HT_CBW 20 and 4 bit peusdo-random integer otherwise | 0 (Static) 1 (Dynamic) | |
| | B0                    B3 | B4 | B5      B6 |

| DYN_BANDWIDTH_IN_NON_HT | First 7 bits of Scrambling Sequence | | | | |
|---|---|---|---|---|---|
| Not present | 5 bit pseudo-random nonzero integer of CH_BANDWIDTH_IN_NON_HT equals NON_HT_CBW 20 and 5 bit peusdo-random integer otherwise | | | | 0 (NON_HT_CBW 20) 1 (NON_HT_CBW 40) 2 (NON_HT_CBW 80) 3 (NON_HT_CBW 160 NON_HT_CBW 80+80) |
| Present | Reserved (1bit) | SU/MU (1bit) | Access Category (2bit) | 0 (Static) 1 (Dynamic) | |
| | B0 | | B3 | B4 | B5      B6 |

METHOD FOR TRANSMITTING AND RECEIVING DATA UNIT BASED ON UPLINK MULTIPLE USER MULTIPLE INPUT MULTIPLE OUTPUT TRANSMISSION AND APPARATUS FOR THE SAME

This Application is a continuation of Ser. No. 14/126,393, which is a 35 U.S.C. §371 National Stage of International Application No. PCT/KR2012/001372, filed Feb. 23, 2012 and claims the benefit of U.S. Provisional Application No. 61/497,062, filed Jun. 15, 2011, all of which are incorporated by reference in their entirety herein.

BACKGROUND OF THE INVENTION

Field of the Invention

The present invention relates to a Wireless LAN (WLAN) system and, more particularly, to a method of transmitting and receiving a data unit based on an uplink Multiple User-Multiple Input Multiple Output (MU-MIMO) transmission scheme in a WLAN system and an apparatus for supporting the method.

Related Art

With the advancement of information communication technologies, various wireless communication technologies have recently been developed. Among the wireless communication technologies, a wireless local area network (WLAN) is a technology whereby Internet access is possible in a wireless fashion in homes or businesses or in a region providing a specific service by using a portable terminal such as a personal digital assistant (PDA), a laptop computer, a portable multimedia player (PMP), etc.

The initial WLAN technology was able to support the rate of 1 to 2 Mbps through frequency hopping, band spreading, and infrared communication by using a 2.4 GHz frequency in accordance with the IEEE 802.11 standard, but the recent WLAN technology can support a maximum rate of 54 Mbps by using Orthogonal Frequency Division Multiplexing (OFDM). Furthermore, in IEEE 802.11, the standards of various technologies, such as the improvements of Quality of Service (QoS), the compatibility of Access Point (AP) protocols, security enhancement, radio resource measurement, a wireless access vehicular environment, fast roaming, a mesh network, interworking with an external network, and wireless network management, are put to practical use or being developed.

Furthermore, in order to overcome limitations to the communication speed that has been considered to be weakness in the WLAN, an IEEE 802.11n standard has recently been regulated as a technology standard. An object of the IEEE 802.11n standard is to increase the speed and reliability of a network and to expand the coverage of a wireless network. More particularly, in order to support a High Throughput (HT) having a maximum data processing speed of 540 Mbps or higher, minimize a transmission error, and optimize the data rate, the IEEE 802.11n standard is based on Multiple Inputs and Multiple Outputs (MIMO) technology in which multiple antennas are used on both sides of a transmitter and a receiver. Furthermore, the standard may use not only a coding scheme for transmitting several redundant copies in order to increase data reliability, but also Orthogonal Frequency Division multiplexing (OFDM) in order to increase the speed.

In a High Throughput (HT) WLAN system based on IEEE 802.11n, a diversity gain and a gain related to an increase of the channel capacity could be obtained by using a Single User (SU) MIMO transmission scheme between an Access Point (AP) and a station (STA). In the SU-MIMO transmission scheme, the degree of freedom of space may be expanded by increasing the number of antennas for transmitting and receiving a radio signal, thereby contributing to the improved performance of a physical layer.

The HT WLAN system has introduced an HT green field PPDU format which may be used in a system including only HT STAs, in addition to the Physical Layer Convergence Procedure (PLCP) Protocol Data Unit (PPDU) format which supports a legacy STA operated according to the standards of the existing WLAN system. Furthermore, the HT WLAN system supports an HT mixed PPDU format which is a PPDU format designed to support an HT system in a system where a legacy STA and an HT STA coexist.

As the spread of the WLAN is activated and applications using the WLAN are diversified, there is a need for a new WLAN system for supporting the throughput higher than the data processing speed supported by the IEEE 802.11n standard. The next-generation WLAN system supporting a Very High Throughput (VHT) is the next version of the IEEE 802.11n WLAN system and is one of IEEE 802.11 WLAN systems which are recently newly proposed in order to support the data processing speed of 1 Gbps or higher in an MAC Service Access Point (SAP).

The next-generation WLAN system allows a plurality of STAs to access and use channels at the same time in order to efficiently use radio channels. To this end, the next-generation WLAN system supports the transmission of a downlink MU-MIMO scheme using multiple antennas. It is here assumed that the downlink is a link along which data is transmitted from an AP to an STA. The AP may perform Spatial Division Multiple Access (SDMA) transmission in which spatially multiplexed data is transmitted to a plurality of STAs at the same time. The overall throughput of the WLAN system can be increased by distributing a plurality of spatial streams into a plurality of STAs using a plurality of antennas and transmitting data to the STAs at the same time.

Meanwhile, if only downlink MU-MIMO transmission is supported, when STAs transmit frames to an AP, a medium access period is divided for every STA, and the STAs independently transit the frames to the AP. In this case, the improvement of the throughput cannot be expected, as compared with the existing WLAN system, because a common frame transmission scheme or an SU-MIMO transmission scheme is used in the uplink transmission period from the STA. On the other hand, if STAs can transmit frames for traffic processing to an AP at the same time, the overall throughput of the WLAN system may be further improved. In order to further improve the efficiency of a WLAN system, there is a need for a method of transmitting and receiving a data unit which supports uplink MU-MIMO transmission.

SUMMARY OF THE INVENTION

It is an object of the present invention to provide a method of transmitting and receiving a data unit based on uplink MU-MIMO in a WLAN system and an apparatus for supporting the method.

In an aspect, a method of receiving a data unit, performed by an Access Point (AP), in a Wireless LAN (WLAN) system is provided. The method includes transmitting a signal protection frame, the signal protection frame comprising a group ID field indicating a Multiple Input Multiple Output (MIMO) transmission STA group including a first station (STA) and a second STA; and, a spatial stream field indicating a number of spatial streams allocated to each of member STAs included in the MIMO transmission STA group; receiving a first preamble for a first data unit from the first STA; receiving a second preamble for a second data unit from the second STA; and simultaneously receiving the first data unit from the first STA and the second data unit from the second STA.

The first preamble may include a first Long Training Field (LTF) for estimating a first MIMO channel between the AP and the first STA and a first signal field comprising control information for interpreting the first data unit.

The second preamble may include a second LTF for estimating a second MIMO channel between the AP and the second STA and a second signal field comprising control information for interpreting the second data unit.

The second preamble may be received after the first preamble has been received.

A time interval where the first preamble is received may overlap with a time interval where the second preamble is received.

A sequence constituting the first LTF and a sequence constituting the second LTF may be orthogonal to each other.

Time when the first preamble starts to be received and time when the second preamble starts to be received may be identical with each other.

The method may further include receiving dummy bits from the second STA between when a transmission of the second LTF is finished and when a reception of the second data unit is started, if a length of the first LTF is longer than a length of the second LTF.

The method may further include transmitting information indicating multi-user transmission, before the transmitting the signal protection frame.

The information indicating the multi-user transmission may be included in a Clear To Send (CTS) frame transmitted by the AP in response to a Request To Send (RTS) frame for uplink transmission, transmitted from the first STA to the AP.

The method may further include receiving Multi-User (MU) indication information indicating that data are to be transmitted through MU transmission, from the first STA.

The MU indication information may be transmitted in an RTS frame by the first STA for uplink transmission.

In another aspect, a wireless apparatus is provided. The apparatus includes a transceiver configured to transmit and receive a radio signal; and a processor functionally coupled to the transceiver. The processor is configured for: transmitting, a signal protection frame, the signal protection frame comprising a group ID field indicating a Multiple Input Multiple Output (MIMO) transmission STA group including a first station (STA) and a second STA; and, a spatial stream field indicating a number of spatial streams allocated to each of member STAs included in the MIMO transmission STA group; receiving a first preamble for a first data unit from the first STA; receiving a second preamble for a second data unit from the second STA; and simultaneously receiving the first data unit from the first STA and the second data unit from the second STA.

An Access Point (AP) provides stations (STAs) associated with the AP with a training sequence and control information for uplink Multiple User-Multiple Input Multiple Output (MU-MIMO) transmission. STAs transmit respective preambles for interpreting data units and, at the same time, transmit the data units to an AP.

Each STA may process uplink traffic within the same time interval. Through such single user transmission, the overall throughput of a WLAN system can be improved as compared with the existing WLAN system in which time is divided into STAs and uplink traffic is processed.

BRIEF DESCRIPTION OF THE DRAWINGS

FIG. 4 is a diagram showing a change of a scrambling sequence for a Clear To Send (CTS) frame according to an embodiment of the present invention;

DESCRIPTION OF EXEMPLARY EMBODIMENTS

Figure 1:
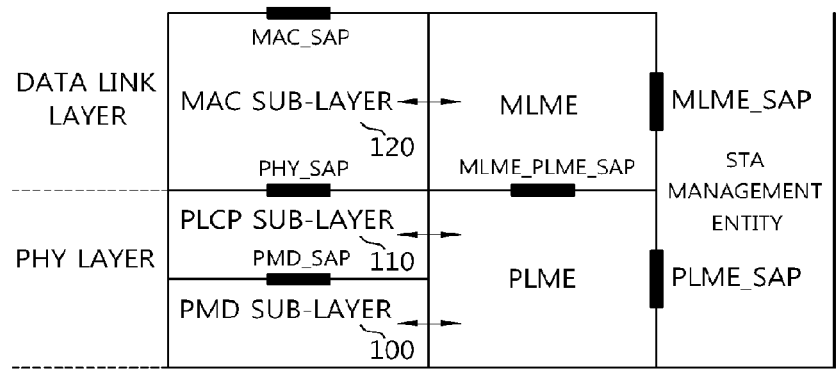
FIG. 1 shows an IEEE 802.11 physical layer (PHY) architecture.

A Wireless Local Area Network (WLAN) system to which embodiments of the present invention may be applied includes one or more Basic Service Sets (BSSs). The BSS is a set of stations (STAs) which can communicate with each other through successful synchronization, and the BSS is not a concept indicating a specific area.

An infrastructure basic service set (BSS) includes one or more non-AP STAs STA1, STA2, STA3, STA4, and STA5, an AP (Access Point) providing distribution service, and a Distribution System (DS) connecting a plurality of APs. In the infrastructure BSS, an AP manages the non-AP STAs of the BSS.

On the other hand, an Independent BSS (IBSS) is operated in an Ad-Hoc mode. The IBSS does not have a centralized management entity for performing a management function because it does not include an AP. That is, in the IBSS, non-AP STAs are managed in a distributed manner. In the IBSS, all STAs may be composed of mobile STAs. All the STAs form a self-contained network because they are not allowed to access the DS.

An STA is a certain functional medium, including Medium Access Control (MAC) and wireless-medium physical layer interface satisfying the Institute of Electrical and Electronics Engineers (IEEE) 802.11 standard. Hereinafter, the STA refers to both an AP and a non-AP STA.

A non-AP STA is an STA which is not an AP. The non-AP STA may also be referred to as a mobile terminal, a wireless device, a wireless transmit/receive unit (WTRU), a user equipment (UE), a mobile station (MS), a mobile subscriber unit, or simply a user. For convenience of explanation, the non-AP STA will be hereinafter referred to as the STA.

The AP is a functional entity for providing connection to the DS through a wireless medium for an STA associated with the AP. Although communication between STAs in an infrastructure BSS including the AP is performed via the AP in principle, the STAs can perform direct communication when a direct link is set up. The AP may also be referred to as a central controller, a base station (BS), a node-B, a base transceiver system (BTS), a site controller, etc.

A plurality of infrastructure BSSs including the BSS can be interconnected by the use of the DS. An extended service set (ESS) is a plurality of BSSs connected by the use of the DS. APs and/or STAs included in the ESS can communicate with each another. In the same ESS, an STA can move from one BSS to another BSS while performing seamless communication.

In a WLAN system based on IEEE 802.11, a basic access mechanism of a medium access control (MAC) is a carrier sense multiple access with collision avoidance (CSMA/CA) mechanism. The CSMA/CA mechanism is also referred to as a distributed coordinate function (DCF) of the IEEE 802.11 MAC, and basically employs a "listen before talk" access mechanism. In this type of access mechanism, an AP and/or an STA senses a wireless channel or medium before starting transmission. As a result of sensing, if it is determined that the medium is in an idle status, frame transmission starts by using the medium. Otherwise, if it is sensed that the medium is in an occupied status, the AP and/or the STA does not start its transmission but sets and waits for a delay duration for medium access.

The CSMA/CA mechanism also includes virtual carrier sensing in addition to physical carrier sensing in which the AP and/or the STA directly senses the medium. The virtual carrier sensing is designed to compensate for a problem that can occur in medium access such as a hidden node problem. For the virtual carrier sending, the MAC of the WLAN system uses a network allocation vector (NAV). The NAV is a value transmitted by an AP and/or an STA, currently using the medium or having a right to use the medium, to anther AP or another STA to indicate a remaining time before the medium returns to an available state. Therefore, a value set to the NAV corresponds to a period reserved for the use of the medium by an AP and/or an STA transmitting a corresponding frame.

The AP and/or the STA may perform a procedure of exchanging a request to send (RTS) frame and a clear to send (CTS) frame to announce that it intends to access a medium. The RTS frame and the CTS frame include information indicating a time duration reserved for access of a radio medium required to transmit and receive an acknowledgement (ACK) frame when an actual data frame transmission and reception ACK is supported. Upon receiving an RTS frame transmitted from an AP and/or an STA intending to transmit a frame or upon receiving a CTS frame transmitted from a frame transmission target STA, another STA can be configured not to access to the medium for the time duration indicated by the information included in the RTS/CTS frame. This can be implemented by configuring an NAV for the time duration.

Meanwhile, if channel sensing is always performed for frame transmission and reception, it causes persistent power consumption of the STA. Since power consumption in a reception state is not much different from power consumption in a transmission state, if the reception state needs to be continuously maintained, relatively great power consumption is generated in an STA that operates by using a battery. Therefore, when the STA senses a channel by persistently maintaining a reception standby state in a WLAN system, ineffective power consumption may be caused without a special synergy effect in terms of a WLAN throughput, and thus it may be inappropriate in terms of power management.

To compensate for the problem above, the WLAN system supports a power management (PM) mode of the STA. A power management (PM) mode of a STA is classified into an active mode and a power save (PS) mode in a WLAN system. Basically, the STA operates in the active mode. When operating in the active mode, the STA can operate in an awake state so that a frame can be received all the time.

When operating in the PS mode, the STA operates by transitioning between a doze state and the awake state. When operating in the doze state, the STA operates with minimum power, and does not receive a radio signal, including a data frame, transmitted from an AP. In addition, the STA operating in the doze state does not perform channel sensing.

The longer the STA operates in a doze state, the less the power consumption is, and thus the longer the STA operates. However, since a frame cannot be transmitted and received in the doze state, the STA cannot operate long unconditionally. If the STA operating in the doze state has a frame to be transmitted to the AP, the STA can transition to an awake state to transmit the frame. However, if the AP has a frame to be transmitted to the STA operating in the doze state, the STA cannot receive the frame and cannot know that there is the frame to be received. Therefore, the STA may need to know whether there is the frame to be transmitted to the STA, and if the frame exists, may require an operation for transitioning to the awake state in accordance with a specific period.

FIG. 1 shows an IEEE 802.11 physical layer (PHY) architecture.

The IEEE 802.11 PHY architecture includes a PHY layer management entity (PLME), a physical layer convergence procedure (PLCP) sub-layer 110, and a physical medium dependent (PMD) sub-layer 100. The PLME provides a PHY management function in cooperation with a MAC layer management entity (MLME). The PLCP sub-layer 110 located between a MAC sub-layer 120 and the PMD sub-layer 100 delivers to the PMD sub-layer 100 a MAC protocol data unit (MPDU) received from the MAC sub-layer 120 under the instruction of the MAC layer, or delivers to the MAC sub-layer 120 a frame received from the PMD sub-layer 100. The PMD sub-layer 100 is a lower layer of the PDCP sub-layer and serves to enable transmission and reception of a PHY entity between two STAs through a radio medium. The MPDU delivered by the MAC sub-layer 120 is referred to as a physical service data unit (PSDU) in the PLCP sub-layer 110. Although the MPDU is similar to the PSDU, when an aggregated MPDU (A-MPDU) in which a plurality of MPDUs are aggregated is delivered, individual MPDUs and PSDUs may be different from each other.

The PLCP sub-layer 110 attaches an additional field including information required by a PHY transceiver to the MPDU in a process of receiving the MPDU from the MAC sub-layer 120 and delivering a PSDU to the PMD sub-layer 100. The additional field attached in this case may be a PLCP preamble, a PLCP header, tail bits required on a data field, etc. The PLCP preamble serves to allow a receiver to prepare a synchronization function and antenna diversity before the PSDU is transmitted. The PLCP header includes a field that contains information on a PLCP protocol data unit (PPDU) to be transmitted, which will be described below in greater detail with reference to FIG. 2.

The PLCP sub-layer 110 generates a PLCP protocol data unit (PPDU) by attaching the aforementioned field to the PSDU and transmits the generated PPDU to a reception STA via the PMD sub-layer. The reception STA receives the PPDU, acquires information required for data recovery from the PLCP preamble and the PLCP header, and recovers the data.

The next-generation WLAN system supports a downlink MU-MIMO transmission scheme in which an AP transmits data to a plurality of STAs. Accordingly, an AP and STAs may have a plurality of antennas. For the Very High Throughput (VHT) to be supported by the next-generation WLAN system, a physical layer supports MU-MIMO and Orthogonal Frequency Division multiplexing (OFDM). For this, channel bandwidths of 20 MHz, 40 MHz, 80 MHz, contiguous 160 MHz, and non-contiguous 160 MHz (80+80 MHz) are supported. Binary Phase Shift Keying (BPSK), Quadrature Phase Shift Keying (QPSK), Quadrature Amplitude Modulation (16QAM), 64QAM, and 256 QAM are applied to each subcarrier. Furthermore, the coding rates of 1/2, 2/3, 3/4, and 5/6 are supported through convolutional coding or Forward Error Correction (FEC) using Low Density Parity Check (LDPC) codes or both as coding schemes.

Meanwhile, according to the downlink MU-MIMO transmission scheme provided by the next-generation WLAN system, STAs cannot cooperate with each other because one AP performs transmission and a plurality of STAs performs reception at the same time. Accordingly, the AP must know information about a channel between the AP and the plurality of STAs, and the AP precodes a data sequence based on the channel information and transmits the data sequence.

In general, precoding includes linear precoding and non-linear precoding. A representative example of the linear precoding is a channel inversion (zero forcing) scheme for removing interference between users. The channel inversion scheme is disadvantageous in that a noise enhancement phenomenon is generated. In order to reduce this problem, a regularized channel inversion (minimum mean squared error) scheme is used. The linear precoding scheme has lower complexity than the nonlinear precoding scheme, but has relatively lower performance than the nonlinear precoding scheme.

The nonlinear precoding scheme includes a vector perturbation scheme for perturbing transmission data in order to reduce the noise enhancement problem and a Dirty Paper Coding (DPC) scheme for obtaining the entire channel capacity in theory. The nonlinear precoding scheme has relatively higher complexity than the linear precoding scheme, but has better performance than the linear precoding scheme.

In a WLAN system supporting an MIMO transmission scheme, the accuracy of channel information owned by an AP has a great influence on WLAN performance. A method of an STA informing an AP of channel information includes a channel sounding method (implicit feedback method) in which the STA transmits a predetermined pattern to the AP so that the AP can estimate the channel information and an explicit feedback method in which the STA inform the AP of the channel information in the form of data.

In a WLAN system supporting MIMO transmission, if channel information is fed back in the form of a data type, there may be a problem in that radio resources for uplink communication are occupied because the size of the feedback channel information is increased. In general, since an AP does not know all pieces of channel information, a scheme of each STA previously determining a preferred beam and informing the AP of beamforming matrix information or a scheme of using a predetermined beam or a codebook between the AP and STAs may be used instead of a precoding scheme using channel information without change.

As an example of the scheme using a predetermined beam, a method of each STA selecting a beam having a maximum Signal to Interference plus Noise Ratio (SINR), from among beams, and transmitting the selected beam with an index of the beam to an AP may be used. This scheme is advantageous in that feedback information is relatively simple because the AP allocates the most preferred STAs to respective beams and transmitting the beams at the same time. This scheme, however, is problematic in that performance is good when the number of STAs is many, but performance may be abruptly deteriorated when the number of STAs is small. As another illustrative scheme, a method of an STA providing preferred beamforming matrix information to an AP and the AP performing precoding using the beamforming matrix information is advantageous in that deterioration of performance is not great as compared with the channel sounding method and calibration is not required.

An AP generates a PPDU based on the obtained channel information and transmits the channel information to a plurality of STAs using the MU-MIMO transmission scheme. The channel information is applied to the training field of the PPDU.

Figure 2:
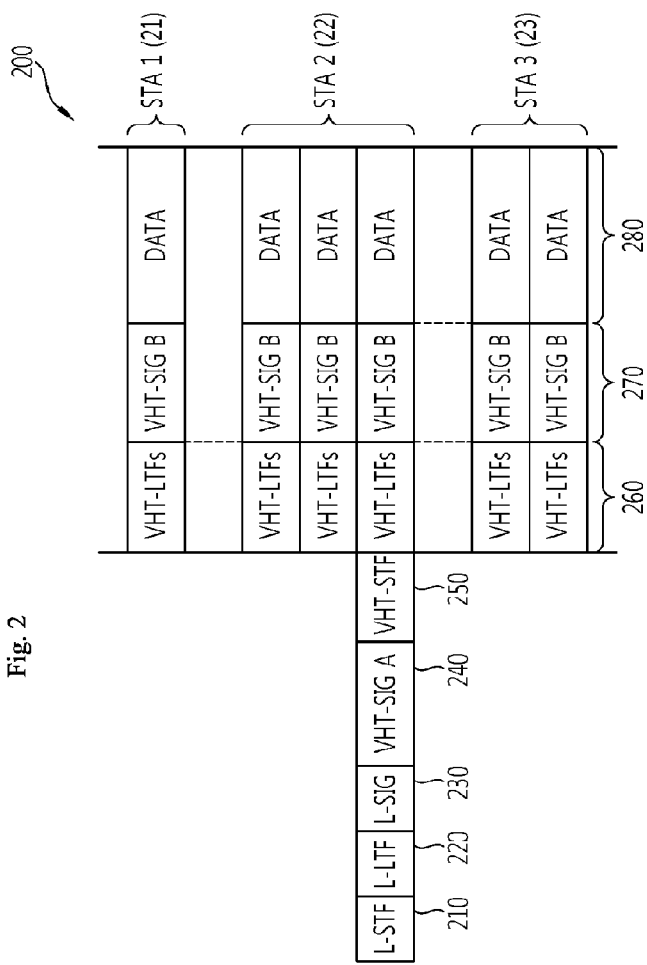
FIG. 2 is a block diagram showing an example of a PPDU format according to an embodiment of the present invention.

FIG. 2 is a block diagram showing an example of a PPDU format according to an embodiment of the present invention.

Referring to FIG. 2, a PPDU 200 may include a Legacy Short Training Field (L-STF) 210, a Legacy Long Training Field (L-LTF) 220, a Legacy Signal (L-SIG) field 230, a VHT-SIG A field 240, a VHT-STF 250, a VHT-LTF 260, a VHT-SIG B field 270, and a data field 280.

A PLCP sublayer constituting a PHY layer adds information necessary for a PHY Service Data Unit (PSDU), received from a Medium Access Control (MAC) layer, to the PSDU, converts the PSDU into the data field 280, generates the PPDU 200 by adding fields, such as the L-STF 210, the L-LTF 220, the L-SIG field 230, the VHT-SIG A field 240, the VHT-STF 250, the VHT-LTF 260, and the VHT-SIG B field 270, to the data field 280, and transmits the PPDU 200 to one or more STAs through a Physical Medium Dependent (PMD) sublayer forming the PHY layer.

The L-STF 210 is used for frame timing acquisition, Automatic Gain Control (AGC) convergence, coarse frequency acquisition, etc.

The L-LTF 220 is used to estimate a channel for demodulating the L-SIG field 230 and the VHT-SIG A field 240.

The L-SIG field 230 is used for an STA to receive a PPDU and obtain data by interpreting the PPDU. In particular, an L-STA not supporting the VHT may obtain data based on information included in the L-SIG field.

The L-SIG field 230 includes a rate subfield, a length subfield, a parity bit, and a tail field. The rate subfield is set to a value indicating the bit rate for data to be now transmitted.

The length subfield is set to a value indicating the octet length of a PSDU that an MAC layer requests a PHY layer to transmit the PSDU. Here, an L-LENGTH parameter related to information about the octet length of the PSDU is determined based on a TXTIME parameter related to the transmission time. TXTIME indicates the transmission time determined by the PHY layer in order to transmit the PPDU, including the PSDU, according to the transmission time requested by the MAC layer in order to transmit the Physical Service Data Unit (PSDU). Accordingly, the L-LENGTH parameter is related to time, and thus the length subfield included in the L-SIG field 230 includes information related to the transmission time.

The VHT-SIG A field 240 is related to common control information necessary for STAs paired with an AP, and it includes control information for interpreting the received PPDU 200. The VHT-SIG A field 240 may be divided into a VHT-SIG A1 field and a VHT-SIG B field. The VHT-SIG A1 field includes information about a used channel bandwidth, ID information about whether Space Time Block Coding (STBC) is used, a group identifier (i.e., ID information about a target transmission STA group), and information about spatial streams allocated to an STA included in a target transmission group STA indicated by the group identifier. The VHT-SIG A2 field may include information related to a short Guard Interval (GI) of a target transmission STA, a Modulation and Coding Scheme (MCS) for a single user, a channel coding type for multi-user, information about beamforming, information about redundancy bits for Cyclic Redundancy Checking (CRC), and information about the tail bits of a convolution decoder. The VHT-SIG A1 field and the VHT-SIG A2 field may be transmitted through respective OFDM symbols.

The VHT-STF field 250 is used to improve AGC estimation performance in MIMO transmission.

The VHT-LTF field 260 is used for an STA to estimate a MIMO channel. The next-generation WLAN system supports MU-MIMO transmission. Thus, the VHT-LTF field 260 may be set by the number of spatial streams where the PPDU 200 is transmitted. In addition, if full channel sounding is supported and performed, the number of VHT LTFs may be further increased.

The VHT-SIG B field 270 includes dedicated control information necessary for a plurality of MIMO-paired STAs to receive the PPDU 200 and obtain data. Accordingly, only when the common control information included in the VHT-SIG B field 270 indicates that the PPDU 200 now received has been subjected to MU-MIMO transmission, an STA may be designed to decode the VHT-SIG B field 270. On the other hand, when the common control information indicates that the PPDU 200 now received is for a single STA (including SU-MIMO), an STA may be designed not to decode the VHT-SIG B field 270.

The VHT-SIG B field 270 includes information about the length of the PSDU included in the data field transmitted to each STA, MCS information, and tail-related information included in the data field. The VHT-SIG B field 270 further includes information about encoding and rate-matching. The size of the VHT-SIG B field 270 may vary according to a type (MU-MIMO or SU-MIMO) of MIMO transmission and a channel bandwidth used for PPDU transmission.

The data field 280 includes data intended to be transmitted to an STA. The data field 280 includes a PLCP Service Data Unit through which an MAC Protocol Data Unit (MPDU) in the MAC layer has been transmitted, a service field for initializing a scrambler, a tail field including a bit sequence necessary to return a convolution encoder to a zero state, and padding bits for standardizing the length of the data field.

Meanwhile, in order to support a further improved throughput, not only the downlink MU-MIMO transmission scheme, but also an uplink MU-MIMO transmission scheme is to be supported. In a WLAN system supporting the uplink MU-MIMO transmission scheme, a plurality of STAs can transmit data to an AP at the same time. In this case, the throughput of the WLAN system can be improved because more traffic can be processed during not only downlink communication, but also uplink communication.

A method of transmitting a data unit using the uplink MU-MIMO transmission scheme is described below. The data unit means a data field including a PSDU in a common PPDU format. Furthermore, a preamble means a training field and a signal field for MIMO transmission.

In the uplink MU-MIMO transmission scheme, a plurality of STAs performs transmission and one AP performs reception. Thus, the uplink MU-MIMO transmission scheme is relatively lower than the downlink MU-MIMO transmission scheme in the degree of importance related to the feedback of channel information. Form a viewpoint of an AP, however, the AP needs to be accompanied by a method of guaranteeing reception synchronization for radio signals transmitted by respective STAs and a power control method for preventing the deterioration of performance when there is a great difference in the reception power of the radio signals. Furthermore, there is a need for a method of reducing overhead resulting from preambles transmitted by a plurality of STAs.

In order to support uplink MU-MIMO transmission in a WLAN system, STAs that will transmit data units at the same time must be specified. The STAs of the WLAN system may be operated in a PS mode. The STAs are alternately operated in a doze state and an awake state. Thus, if an STA of a doze state is selected as a transmission STA, uplink traffic owned by the STA may not be substantially processed.

In a WLAN system supporting uplink MU-MIMO transmission, a method based on a contention based protocol may be taken into account as a method of selecting STAs that will transmit data units. A process of transmitting the data unit may include a procedure in the random access period and a procedure in the data transmission period. STAs having uplink traffic may transmit Request To Send (RTS) frames to an AP in order to request data unit transmission within the random access period, and only a transmission STA group including an STA selected in a contention with other STAs may transmit the data unit in the data transmission period.

To this end, there is proposed a scheme in which an AP designates a transmission STA group. Here, it is assumed that the AP previously knows whether uplink traffic to be transmitted by STAs associated with the AP exists. The AP may set several transmission STA groups by grouping a plurality of STAs, and the transmission STA group may be designated by a group ID. The group ID for uplink MU-MIMO transmission is ID information which exists separately from a group ID for downlink MU-MIMO transmission. The two types of the group IDs may be identical with or different from each other. An AP may change a list of member STAs, included in a transmission STA group, according to a WLAN environment. An AP may determine the number of spatial streams to be used by each of member STAs, included in a transmission STA group indicated by a group ID, and inform each STA of the number of spatial streams. The term 'group ID' hereinafter indicates a group ID for uplink which indicates a transmission STA group for uplink MU-MIMO transmission.

Figure 3:
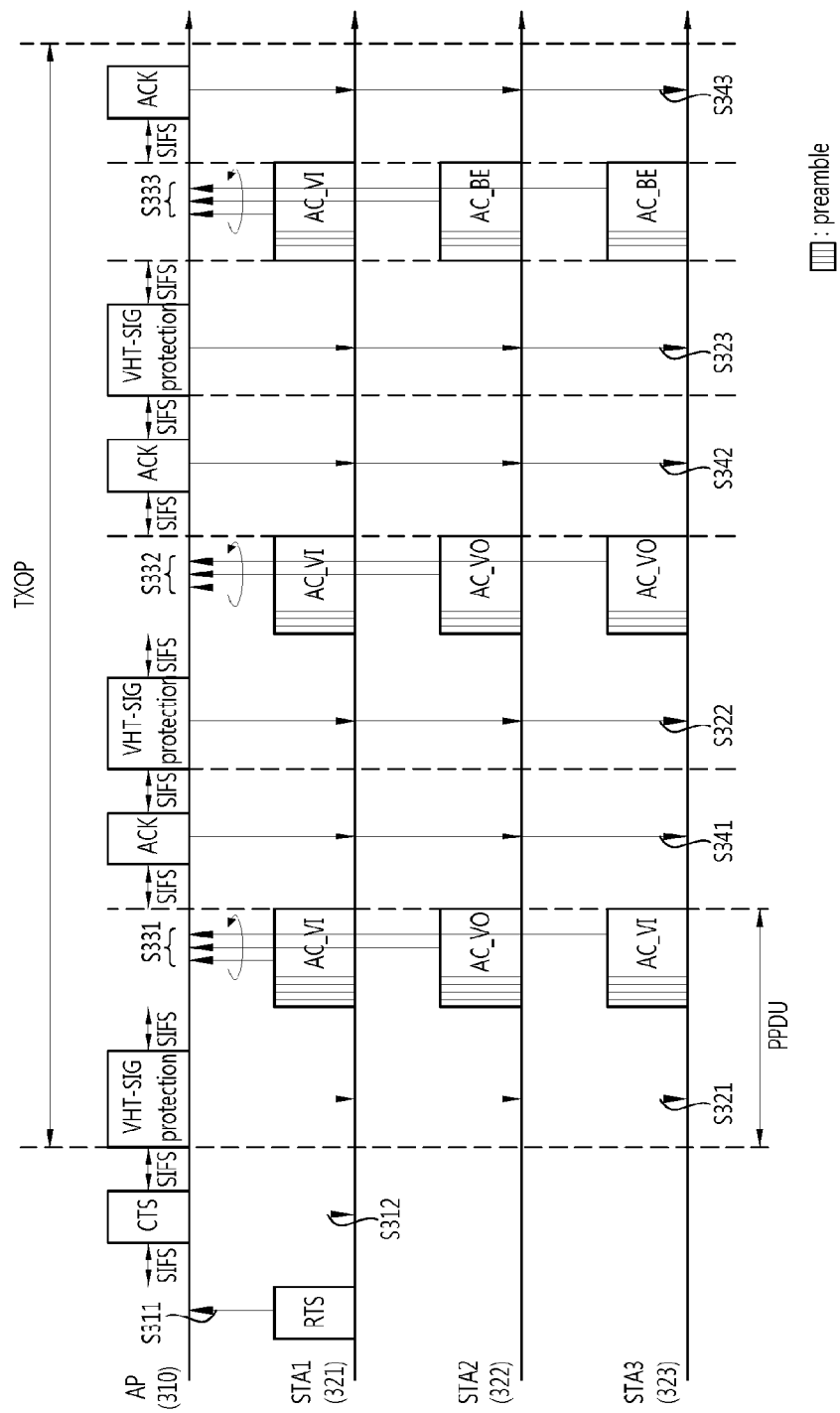
FIG. 3 is a flowchart illustrating a method of transmitting a PPDU using an MU-MIMO transmission scheme according to an embodiment of the present invention.

FIG. 3 is a flowchart illustrating a method of transmitting a PPDU using an MU-MIMO transmission scheme according to an embodiment of the present invention.

Referring to FIG. 3, it is assumed that an AP 310 has been subjected to MU-MIMO paired with three STAs 321, 322, and 323. It is assumed that all the STA1 321, the STA2 322, and the STA3 323 are STAs trying to perform uplink transmission.

The STA1 321 accesses a radio medium through a contention and transmits an RTS frame to the AP 310 in order to request a data unit to be transmitted (S311). The AP 310 transmits a Clear To Send (CTS) frame to the STA1 321 in response to the RTS frame (S312).

The STA1 321 receives the CTS frame and, after a Short InterFrame Space (SIFS), requires information necessary to determine whether the data unit will be transmitted according to a single-user scheme or a multi-user scheme. Furthermore, the STA2 322 and the STA3 323 capable of receiving or overhearing an RTS frame need to obtain information about whether uplink MU-MIMO transmission has been scheduled. In general, it is the reason that a STA having been received a CTS frame, even though the STA has not transmitted a RTS frame, sets a Network Allocation Vector (NAV) until data unit transmission is finished by the STA1 321 that obtained a medium access right.

In order to provide the above information, there is proposed a method of including information indicating whether an after data transmission procedure is single user transmission or multi-user transmission in the CTS frame transmitted by the AP 310. This method is described with reference to FIG. 4.

FIG. 4 is a diagram showing a change of a scrambling sequence for a CTS frame according to an embodiment of the present invention. CH_BANDWIDTH_IN_NON_HT and DYN_BANDWIDTH_IN_NON_HT of FIG. 4 are the transmission/reception information parameters of an STA and an AP. The value of the parameter CH_BANDWIDTH_IN_NON_HT may be CBW20, CBW40, CBW80, or CBW160. The parameter CH_BANDWIDTH_IN_NON_HT is used to modify the first 7 bits of the scrambling sequence to indicate the duplicated bandwidth of a PPDU. The parameter DYN_BANDWIDTH_IN_NON_HT is used to modify the first 7 bits of the scrambling sequence when a transmission STA or a transmission AP or both can operate a static or dynamic bandwidth.

Referring to FIG. 4, the first 7 bits of the scrambling sequence are required in the PLCP DATA scrambling of the RTS/CTS frames. The existing bits are configured as shown on the upper side of FIG. 4. As shown on the lower side of FIG. 4, SU/MU indication information of 1 bit may be included in the value of the first 7 bits of the scrambling sequence of the CTS frame in order to inform reception STAs that which one of the single-user transmission scheme and the multi-user transmission scheme will be used.

In addition, an STA trying to process uplink traffic may inform an AP of information about whether the single user (SU) transmission scheme will be used or the multi-user (MU) transmission scheme will be used along with other STAs. Like in the above method, this may be implemented by including SU/MU indicating information in the value of the first 7 bits of the scrambling sequence of the RTS frame as shown on the lower side of FIG. 4.

Meanwhile, in order to determine a transmission opportunity (TXOP) period, an AP has to determine the TXOP period by taking a TXOP limit value of traffic into account. The TXOP limit value is dependent on an access category (AC) of traffic that will be transmitted by an STA. There are two methods of the AP knowing the TXOP limit value. One of the methods is that an AP obtains information about the time when STAs can transmit packets through the duration field of an RTS frame that has been transmitted by an STA requesting transmission.

The other of the methods is that, since a TXOP limit value is dependent on an AC of traffic, an STA informs an AP of the AC that will be transmitted by the STA and the AP obtains information about the TXOP limit value based in the AC. The first 7 bits of the scrambling sequence are required in the PLCP DATA scrambling of an RTS frame and a CTS frame. They are configured as shown on the upper side of FIG. 4. Information about an AC may be included in the value of the first 7 bits of the RTS/CTS scrambling sequence and transmitted to an AP.

Referring back to FIG. 3, the AP 310 may determine a transmission STA group including the STA1 321. The transmission STA group may be specified by a group ID selected by the AP 310. The AP 310 determines the number of spatial streams to be allocated to each of STAs included in the transmission STA group. The information related to the group ID and the number of spatial streams is control information necessary for uplink MU-MIMO transmission, and the control information needs to be transmitted to the transmission STA group. To this end, the AP 310 transmits a VHT-SIG protection frame to the transmission STA group (S321, S322, and S323). The VHT-SIG protection frame includes control information necessary for uplink MU-MIMO transmission.

Figure 5:
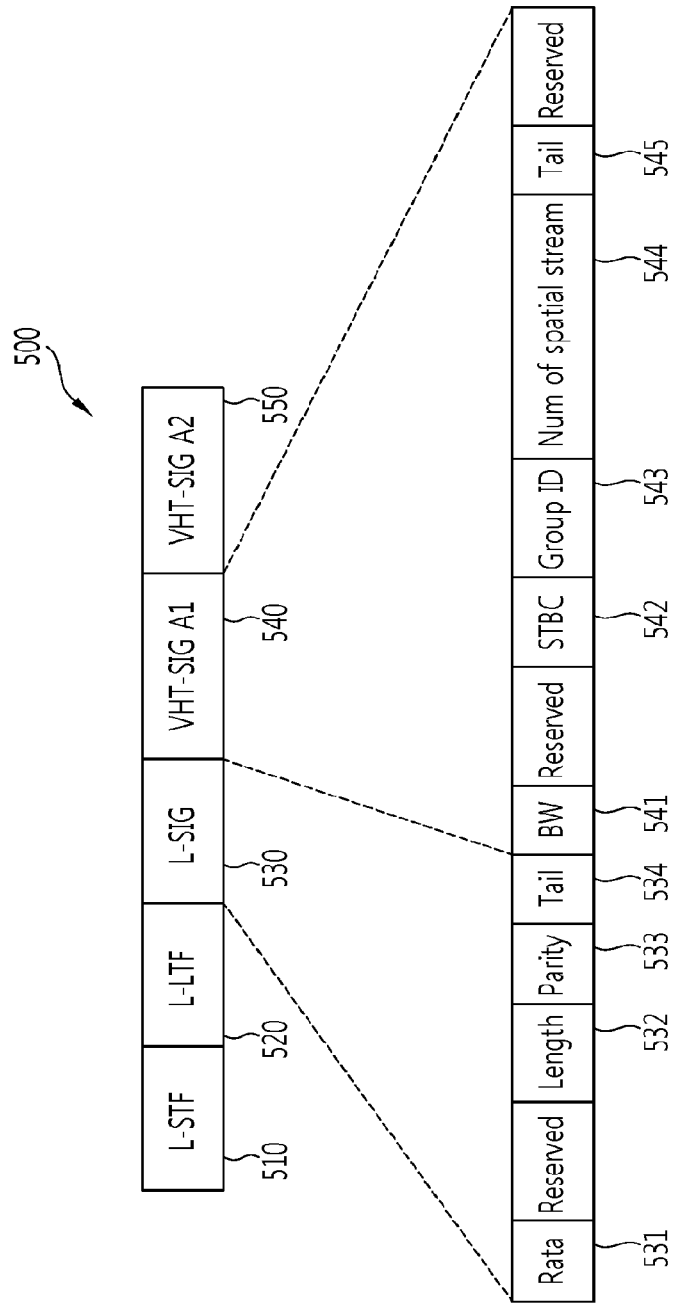
FIG. 5 is a block diagram showing a VHT-SIG protection frame according to an embodiment of the present invention.

FIG. 5 is a block diagram showing the VHT-SIG protection frame according to an embodiment of the present invention.

Referring to FIG. 5, the VHT-SIG protection frame 500 includes an L-STF 510, an L-LTF 520, an L-SIG field 530, a VHT-SIG A1 field 540, and a VHT-SIG A2 field 550.

The L-STF field 510 is used for frame timing acquisition, AGC convergence, coarse frequency acquisition, etc. The L-LTF field 520 is used to estimate a channel for demodulating the L-SIG field 530, the VHT-SIG A1 field 540, and the VHT-SIG A2 field 550.

The L-SIG field 530 includes a rate subfield 531, a length subfield 532, a parity subfield 533, and a tail subfield 534. The rate subfield 531 indicates a data transmission rate which is permitted for the AP 310 and the STAs. The length subfield 532 indicates a time interval in which the STAs can transmit data units according to an uplink MU-MIMO transmission scheme. The parity subfield 533 indicates a parity bit value, and the tail subfield 534 includes tail bits for returning an encoder to a zero state.

The VHT-SIG A1 field 540 includes a bandwidth (BW) subfield 541, a Space Time Block Code (STBC) subfield 542, a group ID subfield 543, the number-of-spatial streams ($N_{SS}$) subfield 544 includes a tail subfield 545. The bandwidth subfield 541 indicates a channel bandwidth to be used for uplink transmission. The STBC subfield 542 indicates whether an STBC will be applied. The group ID subfield 543 indicates a transmission STA group that will transmit the data unit to the AP 310 according to the uplink MU-MIMO transmission scheme. The number-of-spatial-stream subfield 544 indicates the number of spatial streams which has been allocated to each of member STAs included in the transmission STA group.

The VHT-SIG A2 field 550 includes information about whether a short Guard Interval (GI) has been applied, information indicating a coding method to be used by transmission STAs, an MCS index, and information about beamforming.

STAs that have received the VHT-SIG protection frame 500 may determine whether they are included in a transmission STA group based on the group ID of the VHT-SIG A1 field 540. If an STA is included in the transmission STA group, the STA can know the number of spatial streams, allocated thereto, through the number-of-spatial-streams subfield 544.

Referring back to FIG. 3, the STA1 321, the STA2 322, and the STA3 323 correspond to member STAs included in a transmission STA group selected by the AP 310. After receiving the VHT-SIG protection frame, the STA1 321, the STA2 322, and the STA3 323 transmit data units to the AP 310 according to the uplink MU-MIMO transmission scheme. Here, the states of uplink traffic owned by the STAs may differ. Accordingly, uplink transmission procedures performed by the STAs may be different.

Figure 6:
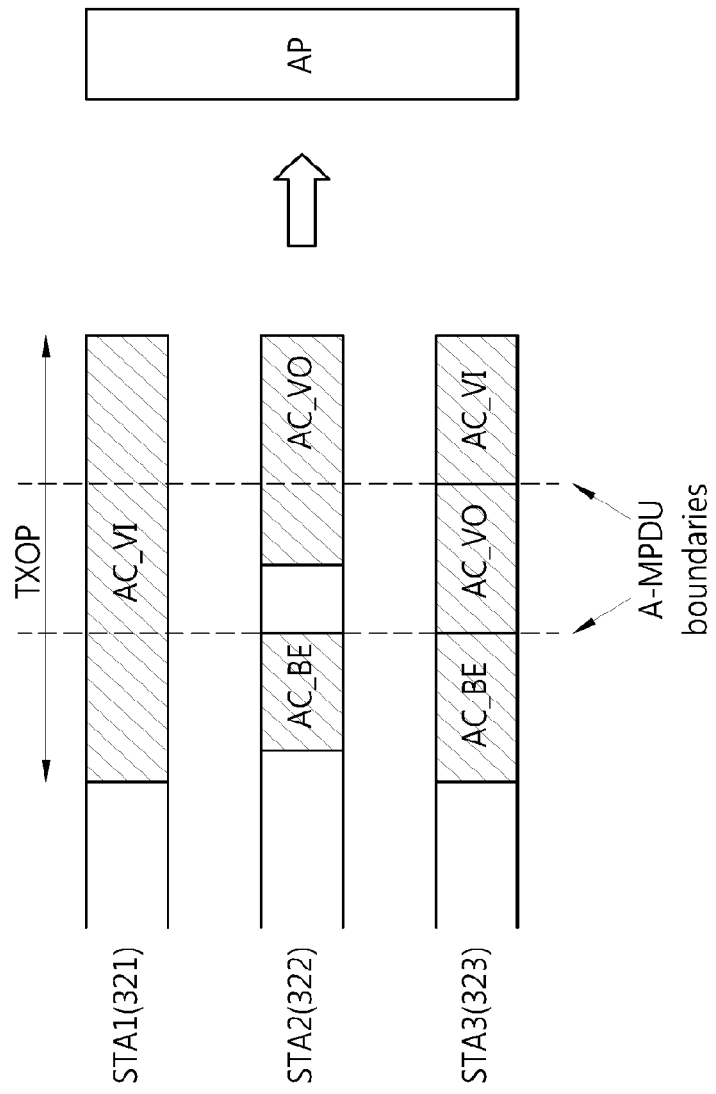
FIG. 6 is a diagram showing a traffic queue for each of STAs.

FIG. 6 is a diagram showing a traffic queue for each of STAs.

Referring to FIG. 6, it can be seen that the amount of traffic accumulated in each of an STA1 321, an STA2 322, and an STA3 323 is different. Each of the STAs calculates the amount of traffic that may be transmitted through one aggregate MPDU (A-MPDU) by using duration information received from an AP and divides the traffic so that the amount of traffic is not exceeded. Here, since only traffic belonging to an access category may be included in one A-MPDU, traffic belonging to other AC should not be included in the one A-MPDU.

As shown, assuming that each STA can transmit the amount of traffic during three TXOP periods, from among pieces of traffic included in the queue of each STA, the STAs process the traffic through three PPDU transmission procedures during the TXOP periods.

Each STA calculates an A-MPDU boundary by using a value included in the duration field of the VHT-SIG protection frame. The STA1 321 divides traffic related to AC_VI (video) according to the A-MPDU boundary. The STA1 321 may process its own traffic through three data unit transmissions. The STA2 322 has traffic related to AC_VO (voice) and traffic related to AC_BE (best effort). The traffic related to AC_VO must be divided into two and transmitted because the traffic exceeds the A-MPDU boundary. The traffic related to AC_BE may be transmitted through one data unit transmission. Meanwhile, the traffic related to AC_BE may be processed through a total of three data unit transmissions because the traffic cannot be transmitted along with the traffic related to AC_VO. The STA3 323 has AC_VI traffic, AC_VO traffic, and AC_BE traffic. The STA3 323 may process the entire traffic through three data unit transmissions because the amount of traffic for each AC exists within the A-MPDU boundary.

Referring back to FIG. 3, each of the STA1 321, the STA2 322, and the STA3 323 divides relevant traffic according to the A-MPDU boundary as shown in FIG. 6 and transmits a data unit, including data related to the traffic, to the AP 310 along with a preamble. The preamble is implemented by the VHT-STF of a downlink MU-MIMO PPDU, a training sequence corresponding to a VHT-LTF, and a VHT-SIG B field as shown in FIG. 2. The AP 310 may obtain timing synchronization and improve AGC estimation through the VHT-STF and the VHT-LTFs, obtain channel information, and then normally receive the data unit. The VHT-SIG B field includes dedicated control information according to an STA that must transmit the data unit, as in the VHT-SIG B field of the PPDU format shown in FIG. 2. The VHT-SIG B field may include a Modulation and Coding Scheme (MCS) used by each STA in order to generate the data unit and information about the length of the PSDU included in the data unit. The AP 310 may obtain data by demodulating and decoding a transmitted radio signal by using the control information included in the VHT-SIG B field.

As described above, a process of the AP 310 transmitting the VHT-SIG protection frame to the STAs and, after a lapse of an SIFS, the STAs transmitting the data units to the AP along with the preambles becomes one PPDU transmission process. A combination of the VHT-SIG protection frame and the format of the preamble and the data unit transmitted by each STA is similar to the PPDU format used for downlink MU-MIMO transmission in FIG. 2.

After a lapse of the SIFS since the VHT-SIG protection frame transmitted by the AP 310 is received (S321), each of the STA1 321, the STA2 322, and the STA3 323 transmits the preamble and the data unit to the AP 310 (S331). The data unit transmitted by the STA1 321 includes data about traffic related to AC_VI. The data unit transmitted by the STA1 322 includes data about traffic related to AC_VO. The data unit transmitted by the STA1 323 includes data about traffic related to AC_VI. After a lapse of an SIFS since the preambles and the data units are received from the STAs, the AP 310, the AP 310 transmits an ACK message to the STA1 321, the STA2 322, and the STA3 323 (S341).

The AP 310 transmits the VHT-SIG protection frame to the STA1 321, the STA2 322, and the STA3 323 again (S322). After a lapse of an SIFS since the VHT-SIG protection frame is received, each of the STA1 321, the STA2 322, and the STA3 323 transmits a preamble and a data unit to the AP 310 (S332). The data unit transmitted by the STA1 321 includes data about traffic related to AC_VI. The data unit transmitted by the STA1 322 includes data about traffic related to AC_VO. The data unit transmitted by the STA1 323 includes data about traffic related to AC_VO. The AP 310 receives the preambles and the data units from the STAs and, after a lapse of an SIFS, transmits an ACK message to the STA1 321, the STA2 322, and the STA3 323 (S342).

The AP 310 transmits the VHT-SIG protection frame to the STA1 321, the STA2 322, and the STA3 323 again (S323). The STA1 321, the STA2 322, and the STA3 323 receive the VHT-SIG protection frame and, after a lapse of an SIFS, transmit respective preambles and respective data units to the AP 310 (S333). The data unit transmitted by the STA1 321 includes data about traffic related to AC_VI. The data unit transmitted by the STA1 322 includes data about traffic related to AC_BE. The data unit transmitted by the STA1 322 includes data about traffic related to AC_BE. The AP 310 receives the preambles and the data units from the STAs and, after a lapse of an SIFS, transmits an ACK message to the STA1 321, the STA2 322, and the STA3 323 (S343).

The above three data transmission procedures are performed within the obtained TXOP period. During each of the data transmission intervals, each STA adds a preamble to a data unit (i.e., a PSDU including data to be transmitted) and transmits the data unit to an AP. Here, since the AP must be able to distinguish the preambles, transmitted by the STAs, from each other, the STAs must transmit the respective preambles using a method in which the AP can distinguish the preambles from each other. As a method of transmitting the preambles so that they can be distinguished from each other, a Time Division Multiple Access (TDMA) scheme and a Spatial Division Multiple Access (SDMA) scheme may be taken into consideration.

Figure 7:
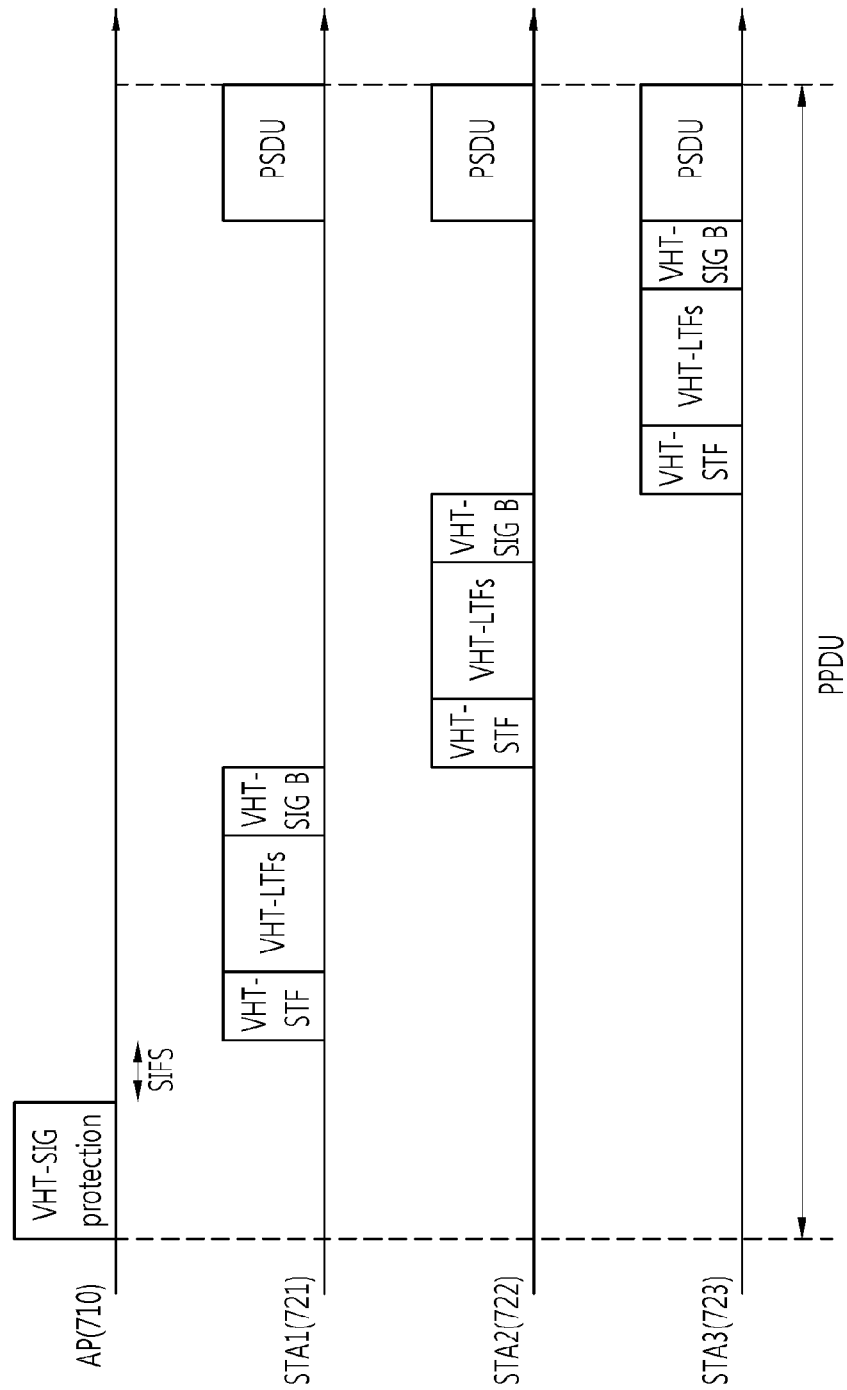
FIG. 7 is a flowchart illustrating an example of a method of transmitting a PPDU according to an embodiment of the present invention.

FIG. 7 is a flowchart illustrating an example of a method of transmitting a PPDU according to an embodiment of the present invention.

Referring to FIG. 7, an AP 710 transmits a VHT-SIG protection frame to an STA1 721, an STA2 722, and an STA3 723.

The STA1 721, the STA2 722, and the STA3 723 transmit only their preambles according to a predetermined sequence. The predetermined sequence may be determined according to the position sequence of spatial streams allocated to a group ID. In this example, after the STA1 721 transmits the preamble, the STA2 722 transmits the preamble and then the STA3 723 transmits the preamble. After the STAs transmit all the preambles, they transmit their PSDUs to the AP 710 at the same time.

A method based on the SDMA scheme may be used as the method of transmitting a PPDU according to the embodiment of the present invention. As a common solution when preambles overlap with each other, orthogonal codes having a less cross correlation may be used according to the sequence forming the STF/LTF of each STA. A set of orthogonal codes is previously specified. When a transmission STA group is determined by an AP, an STA may use a code according to its sequence within the previously specified codes according to its sequence.

Meanwhile, the lengths of the preambles transmitted by the STAs may be different. A point of time at which the STAs transmit the PSDUs is identical with a point of time at which the transmission of the PSDU is finished. Accordingly, each of the STAs may set a point of time at which the transmission of the PSDU is finished by using a different method of transmitting the preamble.

Figure 8:
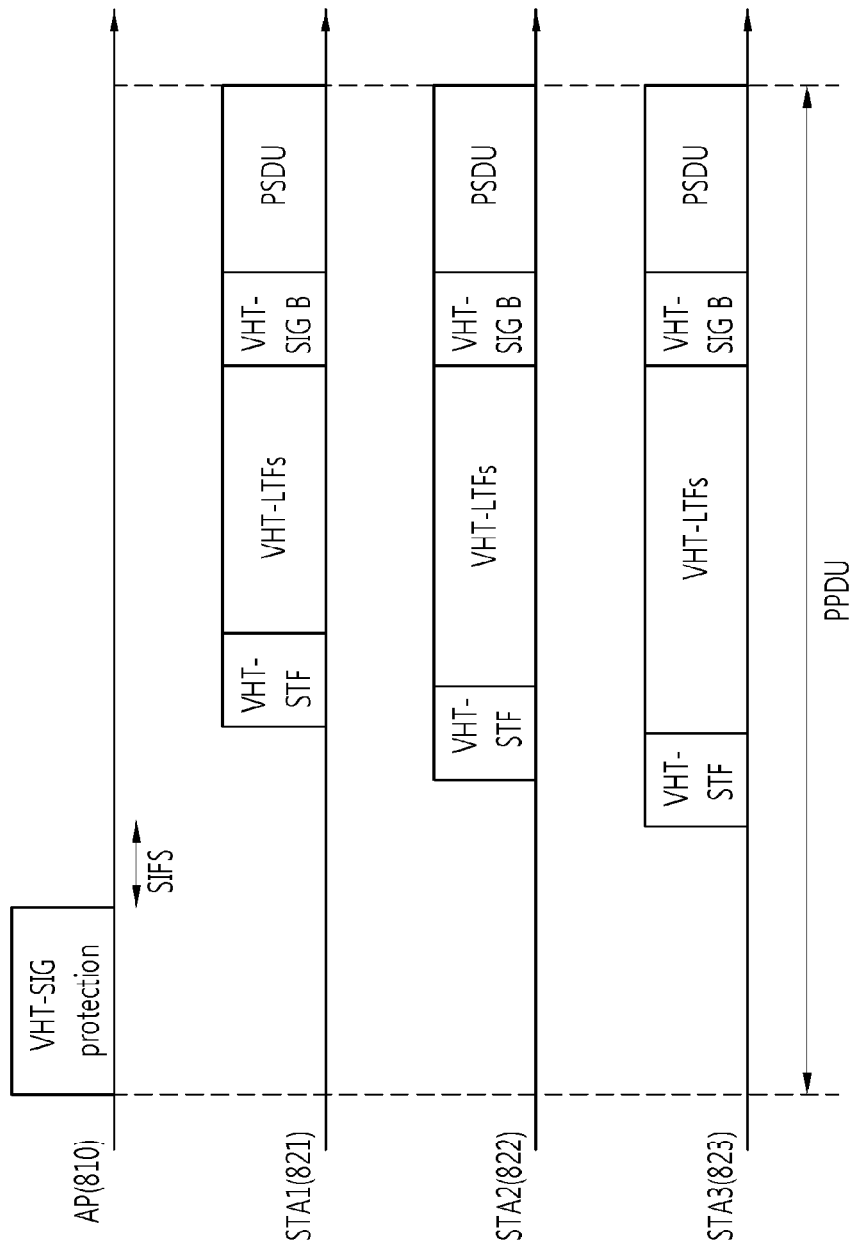
FIG. 8 is a flowchart illustrating an example of a method of transmitting a PPDU based on an SDMA scheme according to an embodiment of the present invention.

FIG. 8 is a flowchart illustrating an example of a method of transmitting a PPDU based the SDMA scheme according to an embodiment of the present invention. Referring to FIG. 8, each of STAs 821, 822, and 823 differently sets a point of time at which a preamble is transmitted to an AP 810. Meanwhile, a point of time at which a PSDU is transmitted is identical with a point of time at which the transmission of the PSDU is finished.

Figure 9:
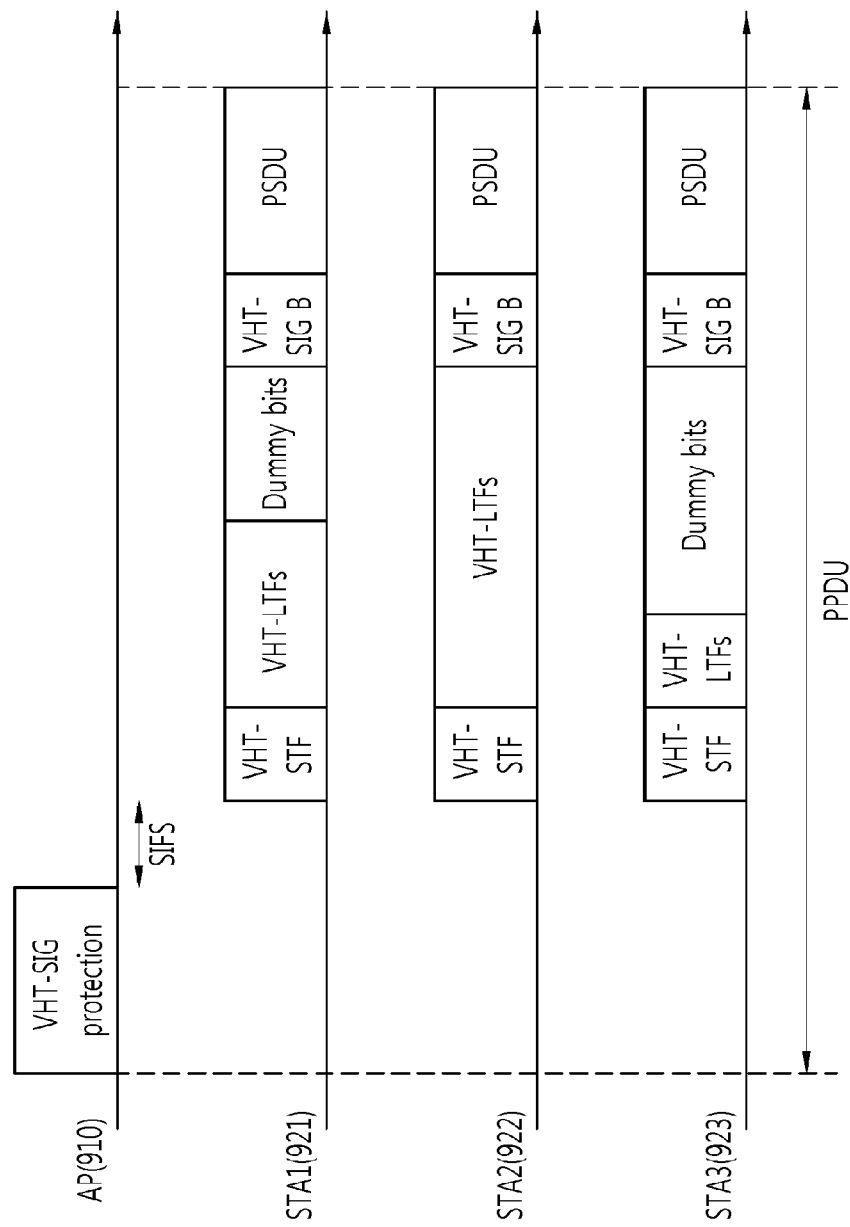
FIG. 9 is a flowchart illustrating another example of a method of transmitting a PPDU based on an SDMA scheme according to an embodiment of the present invention.

FIG. 9 is a flowchart illustrating another example of a method of transmitting a PPDU based on SDMA according to an embodiment of the present invention. Referring to FIG. 9, STAs 921, 922, and 923 start transmitting respective preambles to an AP 910 at the same time. Here, points of time at which the STAs 921, 922, and 923 transmit respective PSDUs may become identical with each other by adding dummy bits to VHT-LTF fields forming the respective preambles. Accordingly, the transmission of the PSDUs by the STAs can be finished at the same time.

Figure 10:
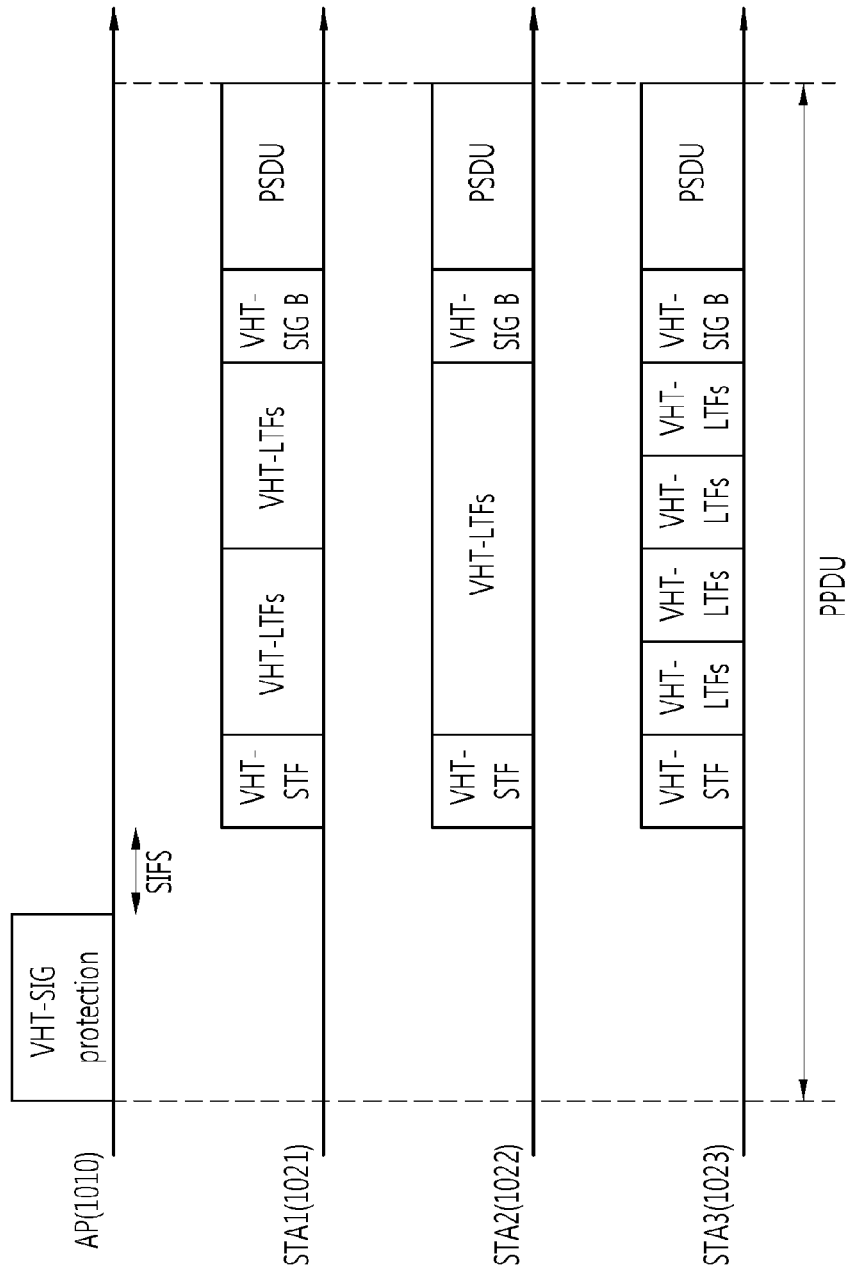
FIG. 10 is a flowchart illustrating yet another example of a method of transmitting a PPDU based on an SDMA scheme according to an embodiment of the present invention.

FIG. 10 is a flowchart illustrating yet another example of a method of transmitting a PPDU based on the SDMA scheme according to an embodiment of the present invention. Referring to FIG. 10, STAs 1021, 1022, and 1023 start transmitting respective preambles to an AP 1010 at the same time. In the example of FIG. 10, unlike in the example of FIG. 9, the total lengths of VHT-LTFs transmitted by the STAs 1021, 1022, and 1023 become identical with each other by repeatedly adding a bit sequence forming a single VHT-LTF. Through this process, a point of time at which each STA transmits a PSDU may become identical with a point of time at which the transmission of the PSDU is finished.

Figure 11:
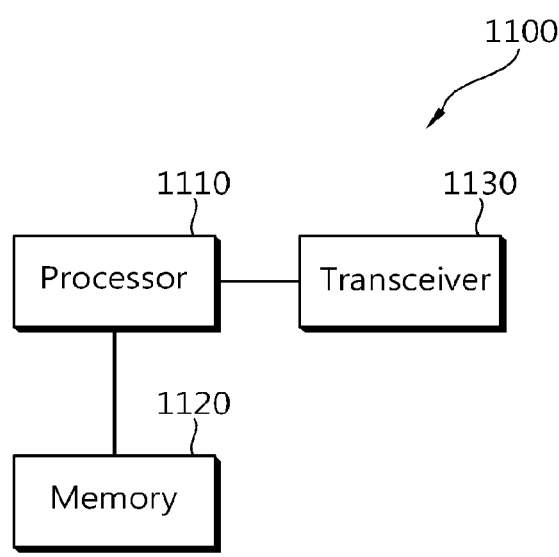
FIG. 11 is a block diagram showing a wireless apparatus in which the embodiments of the present invention may be implemented.

FIG. 11 is a block diagram showing a wireless apparatus in which the embodiments of the present invention may be implemented.

Referring to FIG. 11, the wireless apparatus 1100 includes a processor 1110, memory 1120, and a transceiver 1130. The transceiver 1130 transmits and receives a radio signal and implements the physical layer of IEEE 802.11. The processor 1110 is functionally coupled to the transceiver 1130 and is configured to generate a data unit, including a preamble and a PSDU forming a PPDU for uplink MU-MIMO transmission. The processor 1110 is set to implement the MAC layer or the PHY layer or both which implements the embodiments of the present invention shown in FIGS. 3 to 10.

The processor 1110 or the transceiver 1130 or both may include Application-Specific Integrated Circuits (ASICs), other chipsets, logic circuits and/or data processing units. When an embodiment is implemented in software, the above scheme may be implemented using a module (process, function, etc.) for performing the above functions. The module may be stored in the memory 1120 and executed by the processor 1110. The memory 1120 may be included in the processor 1110 or placed outside the processor 1110 and may be functionally coupled to the processor 1110 by various known means.

What is claimed is:

1. A method of receiving a data unit in a Wireless LAN (WLAN) system, comprising:

receiving, by an Access Point (AP), control information from each of a plurality of stations (STAs) indicating whether a corresponding station (STA) supports uplink multi-user transmission;

receiving, by the AP, access category (AC) information from each of the plurality of STAs indicating an AC of uplink traffic for a corresponding STA;

configuring, by the AP, a signal protection frame requesting uplink multi-user transmission, wherein recipients of the signal protection frame are determined by the AP based on the control information, wherein radio resources used for the uplink multi-user transmission are determined by the AP based on the access category (AC) information, and wherein the signal protection frame indicates the recipients of the signal protection frame, spatial streams allocated for the recipients of the signal protection frame, and a time duration used for the uplink multi-user transmission;

transmitting, by the AP, a downlink physical layer protocol data unit (PPDU) comprising the signal protection frame to the recipients of the signal protection frame; and simultaneously receiving, by the AP, uplink PPDUs from the recipients of the signal protection frame using the radio resources, wherein each of the uplink PPDUs comprise a preamble field including a Short Training Field (STF) and a Long Training Field (LTF).

2. The method of claim 1, further comprising:

waiting, by the AP, during an inter-frame space (SIFS) period after receiving the uplink PPDUs; and transmitting, by the AP, at least one ACK frame indicating an acknowledgement (ACK) of the uplink PPDUs.

3. The method of claim 2, wherein the downlink PPDU and the at least one ACK frame are transmitted during the same transmission opportunity (TXOP).

4. The method of claim 1, wherein the control information is 1-bit indicator.

5. A wireless apparatus, comprising:

a transceiver that transmits and receives a radio signal; and a processor functionally coupled to the transceiver, wherein the processor:

controls the transceiver to receive control information from each of a plurality of stations (STAs) indicating whether a corresponding station (STA) supports uplink multi-user transmission;

controls the transceiver to receive access category (AC) information from each of the plurality of STAs indicating an AC of uplink traffic for a corresponding STA;

configures a signal protection frame requesting uplink multi-user transmission, wherein recipients of the signal protection frame are determined based on the control information, wherein radio resources used for the uplink multi-user transmission are determined based on the access category (AC) information, and wherein the signal protection frame indicates the recipients of the signal protection frame, spatial streams allocated for the recipients of the signal protection frame, and a time duration used for the uplink multi-user transmission;

controls the transceiver to transmit a downlink physical layer protocol data unit (PPDU) comprising the signal protection to the recipients of the signal protection frame; and controls the transceiver to simultaneously receive uplink PPDUs from the recipients of the signal protection frame using the radio resources, wherein each of the uplink PPDUs comprise a preamble field including a Short Training Field (STF) and a Long Training Field (LTF).

6. The wireless apparatus of claim 5, wherein the processor further:

waits during an inter-frame space (SIFS) period after receiving the uplink PPDUs; and controls the transceiver to transmit at least one ACK frame indicating an acknowledgement (ACK) of the uplink PPDUs.

7. The wireless apparatus of claim 6, wherein the downlink PPDU and the at least one ACK frame are transmitted during the same transmission opportunity (TXOP).

8. The wireless apparatus of claim 5, wherein the control information is 1-bit indicator.

* * * * *